(12) United States Patent
Cho et al.

(10) Patent No.: US 10,094,583 B2
(45) Date of Patent: Oct. 9, 2018

(54) CENTRAL COOLING SYSTEM AND CONTROLLING METHOD FOR THE SAME

(71) Applicant: HANWHA TECHWIN CO., LTD., Changwon-si (KR)

(72) Inventors: Jung Kwon Cho, Changwon-si (KR); Ju Seong Kim, Changwon-si (KR); Byung Cheon Ahn, Seongnam-si (KR); Jin Won Hwang, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 807 days.

(21) Appl. No.: 14/210,588

(22) Filed: Mar. 14, 2014

(65) Prior Publication Data

US 2015/0144323 A1    May 28, 2015

(30) Foreign Application Priority Data

Nov. 26, 2013    (KR) .......................... 10-2013-0144922

(51) Int. Cl.
*F24F 1/00*    (2011.01)
*F24F 11/00*    (2018.01)
(Continued)

(52) U.S. Cl.
CPC .......... *F24F 11/0012* (2013.01); *F24F 3/044* (2013.01); *F24F 11/30* (2018.01);
(Continued)

(58) Field of Classification Search
CPC ...... F25B 2700/2116; F25B 2700/2117; F24F 2011/0075
See application file for complete search history.

(56) References Cited

U.S. PATENT DOCUMENTS 4,325,223 A * 4/1982 Cantley .............. G05D 23/1917
    62/126
4,393,662 A * 7/1983 Dirth ........................ F25B 5/02
    165/268
(Continued)

FOREIGN PATENT DOCUMENTS

CN    101023718 A    8/2007
CN    101688717 A    3/2010
(Continued)

OTHER PUBLICATIONS

Ahn et al., Optimal Control for Centrel Cooling Plants, 2010, Document can be found in http://www.ibpsa.org/proceedings/bs1999/bs99_b-05.pdf.*

(Continued)

*Primary Examiner* — Nelson Nieves
(74) *Attorney, Agent, or Firm* — Sughrue Mion, PLLC

(57) ABSTRACT

Provided is a central cooling system including: a ventilation fan unit configured to provide air to a predetermined space; a chiller unit configured to provide heat exchange medium to lower temperature of the air; a cooling tower unit configured to provide a coolant to the chiller unit to lower temperature of the heat exchange medium, and configured to lower temperature of the coolant through heat exchange between the coolant and ambient air; a sensor unit configured to measure the temperatures of the air, the heat exchange medium, and the coolant, and temperature and humidity of the ambient air; and a control unit configured to monitor energy consumption of the central cooling system and configured to calculate at least one of a control temperature of the heat exchange medium, a control temperature of the coolant, and a control temperature of the air which minimizes the energy consumption.

6 Claims, 5 Drawing Sheets

(51) Int. Cl.
*F24F 3/044* (2006.01)
*G05D 23/19* (2006.01)
*F24F 11/30* (2018.01)
F24F 110/10 (2018.01)
F24F 110/20 (2018.01)
F24F 11/46 (2018.01)

(52) U.S. Cl.
CPC .......... *G05D 23/1931* (2013.01); *F24F 11/46* (2018.01); *F24F 2110/10* (2018.01); *F24F 2110/20* (2018.01)

(56) References Cited

U.S. PATENT DOCUMENTS

| | | | | |
|---|---|---|---|---|
| 4,495,777 A | * | 1/1985 | Babington | F25D 17/02 165/299 |
| 5,040,377 A | * | 8/1991 | Braun | F25B 49/027 165/299 |
| 5,600,960 A | * | 2/1997 | Schwedler | F25B 49/027 62/185 |
| 5,963,458 A | * | 10/1999 | Cascia | F25B 49/02 165/200 |
| 8,019,477 B2 | | 9/2011 | Bash et al. | |
| 8,036,779 B2 | * | 10/2011 | Ito | F24F 11/0009 165/200 |
| 2008/0034767 A1 | | 2/2008 | Ziehr et al. | |
| 2009/0030554 A1 | | 1/2009 | Bean, Jr. et al. | |
| 2010/0077776 A1 | * | 4/2010 | Takenami | F24F 11/0009 62/98 |
| 2011/0276182 A1 | * | 11/2011 | Seem | F25B 49/027 700/276 |
| 2013/0264046 A1 | * | 10/2013 | Chainer | G06F 1/206 165/287 |
| 2014/0180483 A1 | * | 6/2014 | Cheng | G05D 23/1931 700/278 |

FOREIGN PATENT DOCUMENTS

| | | |
|---|---|---|
| CN | 101902897 A | 12/2010 |
| KR | 1996-0014814 A | 5/1996 |
| KR | 10-2006-0090429 A | 8/2006 |
| KR | 10-2008-0015361 A | 2/2008 |
| KR | 10-2008-0040073 A | 5/2008 |
| KR | 10-0863771 B1 | 10/2008 |
| KR | 10-2010-0008814 A | 1/2010 |
| KR | 10-2012-0067720 A | 6/2012 |
| KR | 10-2012-0073491 A | 7/2012 |

OTHER PUBLICATIONS

Sensible Heat Ratio Formulas.*
Ulleberg, Emulation and Control of Heating, Ventilation, and Air-Conditioning Systems, 1993.*
Communication dated Jun. 22, 2018, issued by the State Intellectual Property Office of P.R. China in counterpart Chinese Application No. 201410214016.2 English translation.

* cited by examiner

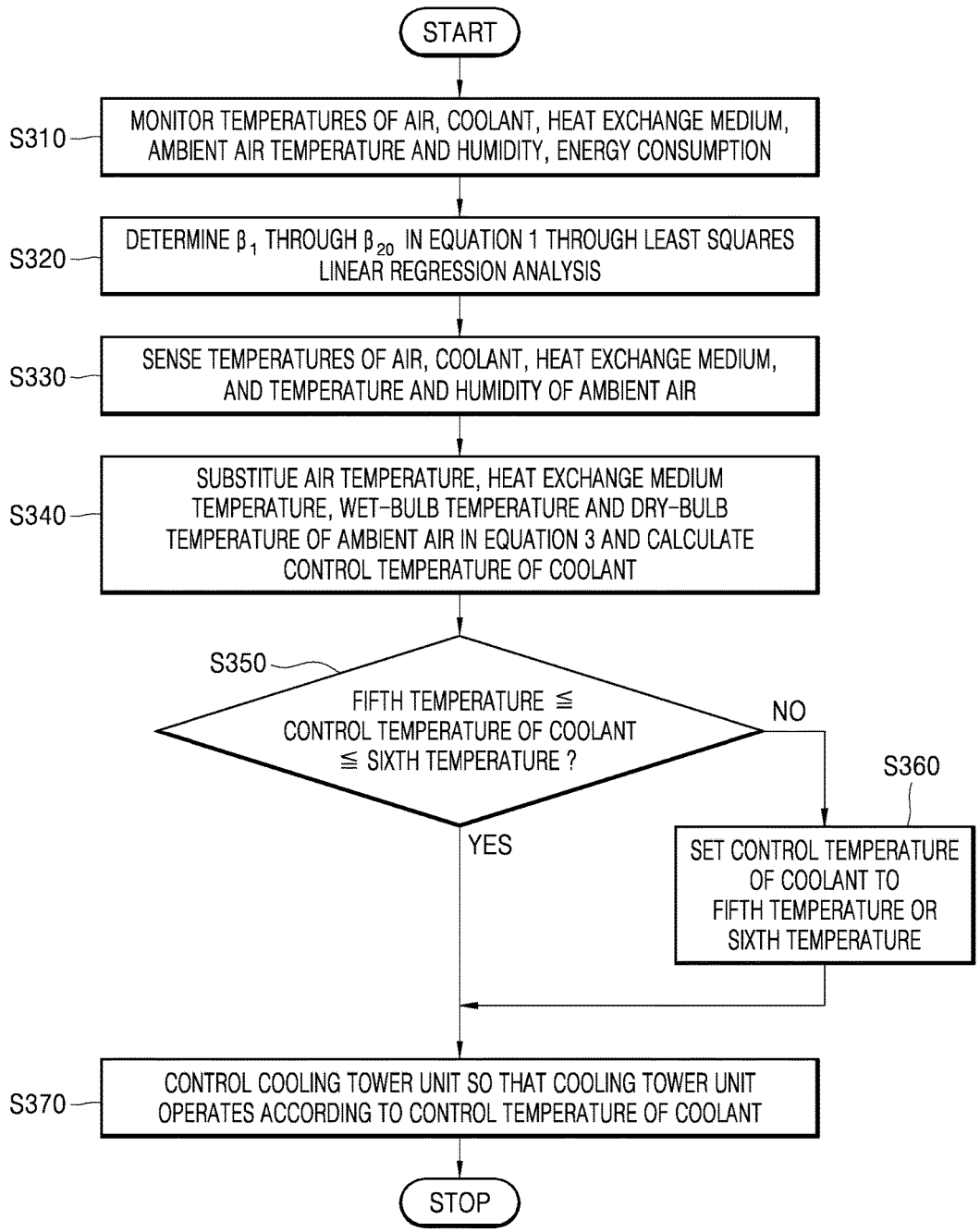

CENTRAL COOLING SYSTEM AND CONTROLLING METHOD FOR THE SAME

CROSS-REFERENCE TO RELATED APPLICATION

This application claims priority from Korean Patent Application No. 10-2013-0144922, filed on Nov. 26, 2013, in the Korean Intellectual Property Office, the disclosure of which is incorporated herein by reference in its entirety.

BACKGROUND

1. Field

Apparatuses and methods consistent with exemplary embodiments relate to a central cooling system and a controlling method for the same, and more particularly, to a central cooling system including an optimization control unit and a controlling method for the same.

2. Description of the Related Art

In the related art, a central cooling system may be used to lower the temperature of a sectioned space, by operating a refrigerating cycle. Such central cooling system may be provided mainly in a spacious place such as a building. The central cooling system may include a heat exchanger in which heat exchange between a heat exchange medium and air is performed, a ventilation fan which sends the heat-exchanged air to a predetermined area, and a cooling tower which cools the heat exchange medium.

In the central cooling system of the related art, the heat exchange medium cooled through the cooling tower flows into the heat exchanger. Through the heat exchange between flowing air and the heat exchange medium, the temperature of the flowing air is lowered, and according to an operation of a ventilation fan unit, the flowing air may be sent to an area which needs cooling.

The central cooling systems described above may have different energy efficiencies, depending on the temperature of the heat exchange medium, the temperature of the coolant flowing into the cooling tower, and the temperature of the air outside the building. Therefore, it is very important to adjust the temperatures of the coolant and the heat exchange medium according to the temperature of ambient air. Such central cooling system is disclosed in Korean Laid-Open Patent Publication No. 1991-0018743.

SUMMARY

One or more exemplary embodiments provide a central cooling system and a control method thereof.

According to an aspect of the present invention, there is provided a central cooling system including: a ventilation fan unit configured to provide air to a predetermined space; a chiller unit configured to provide a heat exchange medium to lower a temperature of the air through heat exchange between the air flowing into or out of the ventilation fan unit and the heat exchange medium; a cooling tower unit configured to provide a coolant to the chiller unit to lower a temperature of the heat exchange medium through heat exchange between the coolant and the heat exchange medium, and configured to lower a temperature of the coolant through heat exchange between the coolant and ambient air outside of the predetermined space; a sensor unit configured to measure the temperature of the air provided from the ventilation fan unit, the temperature of the heat exchange medium discharged from the chiller unit, the temperature of the coolant discharged from the cooling tower unit, and a temperature and humidity of the ambient air; and a control unit configured to monitor energy consumption of the central cooling system according to the temperature of the air, the temperature of the heat exchange medium and the temperature of the coolant measured in the sensor unit when the ventilation fan unit, the chiller unit and the cooling tower unit are in operation, and configured to calculate at least one of a control temperature of the heat exchange medium, a control temperature of the coolant, and a control temperature of the air which minimizes the energy consumption based on the measured temperatures and humidity in the sensor unit.

The control unit may be configured to control the operation of at least one of the ventilation fan unit, the heat exchange unit, and the cooling tower unit corresponding to at least one of the calculated control temperatures of the heat exchange medium, the coolant, and the air.

The control unit may be configured to calculate the energy consumption (Power) by a quadratic function (P) in which an optimum condition is analytically determined according to the following equation:

$$\text{Power} = P(T_{co}, T_{ao}, T_{ch}, T_{wb}, T_{out})$$

wherein $T_{co}$ denotes the temperature or the control temperature of the coolant, Tao denotes the temperature or the control temperature of the air, $T_{ch}$ denotes the temperature or the control temperature of the heat exchange medium, $T_{wb}$ denotes the wet-bulb temperature of ambient air, and $T_{out}$ denotes the dry-bulb temperature of the ambient air.

The control unit may be configured to determine at least one coefficient or constant value of the quadratic function (P) through a least squares linear regression analysis for the energy consumption of the central cooling system according to measured temperatures and humidity in the sensor unit when the central cooling system is in operation.

The control unit may be configured to calculate the control temperature of the coolant, the control temperature of the air, and the control temperature of the heat exchange medium to minimize the energy consumption through the following equations:

$$\frac{\partial P(T_{ao}, T_{co}, T_{ch}, T_{wb}, T_{out})}{\partial T_{co}} = 0 \quad 0 = G_1(T_{co}, T_{ch}, T_{ao}, T_{wb}, T_{out})$$

$$\frac{\partial P(T_{ao}, T_{co}, T_{ch}, T_{wb}, T_{out})}{\partial T_{ao}} = 0 \quad 0 = G_2(T_{co}, T_{ch}, T_{ao}, T_{wb}, T_{out})$$

$$\frac{\partial P(T_{ao}, T_{co}, T_{ch}, T_{wb}, T_{out})}{\partial T_{ch}} = 0 \quad 0 = G_3(T_{co}, T_{ch}, T_{ao}, T_{wb}, T_{out})$$

wherein $T_{co}$ denotes the temperature or the control temperature of the coolant, Tao denotes the temperature or the control temperature of the air, $T_{ch}$ denotes the temperature or the control temperature of the heat exchange medium, $T_{wb}$ denotes the wet-bulb temperature of ambient air, and $T_{out}$ denotes the dry-bulb temperature of the ambient air.

The control unit may be configured to compare the calculated control temperature of the heat exchange medium with a first temperature range and configured to set the control temperature of the heat exchange medium according to a result of the comparison.

The control unit may be configured to compare the calculated control temperature of the coolant with a second temperature range and configured to set the control temperature of the coolant according to a result of the comparison.

The control unit may be configured to compare the calculated control temperature of the air with a third temperature range and configured to set the control temperature of the according to a result of the comparison.

According to an aspect of another exemplary embodiment, there is provided a control method of a central cooling system including: obtaining a temperature of air provided by a ventilation fan unit, a temperature of a heat exchange medium discharged from a chiller unit, a temperature of a coolant discharged from a cooling tower unit, a temperature of ambient air outside a predetermined space, humidity of the ambient air outside the predetermined space, and energy consumption of the central cooling system; calculating at least one constant of a quadratic function, Power=P($T_{co}$, $T_{ao}$, $T_{ch}$, $T_{wb}$, $T_{out}$), which is a relational expression of the energy consumption (Power), based on the obtained results of the temperature of the air, the temperature of the heat exchange medium, the temperature of the coolant, and the temperature and humidity of the ambient air; calculating at least one of a control temperature of the air, a control temperature of the heat exchange medium and a control temperature of the coolant which minimizes the energy consumption, from the quadratic function; and controlling an operation of at least one of the ventilation fan unit, the chiller unit and the cooling tower unit corresponding to at least one of the calculated control temperatures of the air, the heat exchange medium and the coolant, wherein $T_{co}$ denotes the temperature of the coolant, Tao denotes the temperature of air, $T_{ch}$ denotes the temperature of the heat exchange medium, $T_{wb}$ denotes a wet-bulb temperature of the ambient air, and $T_{out}$ denotes a dry-bulb temperature of the ambient air.

The control method may further include calculating the dry-bulb temperature and the wet-bulb temperature of the ambient air, from the temperature and humidity of the ambient air.

The calculating the at least one constant may include determining the at least one constant through a least squares linear regression analysis for the energy consumption of the central cooling system according to obtained temperatures and humidity in the sensor unit when the central cooling system is in operation.

The calculating the at least one of the control temperatures of the coolant, the air, and the heat exchange medium may include calculating the at least one of the control temperatures of the coolant, the air, and the heat exchange medium through the following equations:

$$\frac{\partial P(T_{ao}, T_{co}, T_{ch}, T_{wb}, T_{out})}{\partial T_{co}} = 0 \quad 0 = G_1(T_{co}, T_{ch}, T_{ao}, T_{wb}, T_{out})$$

$$\frac{\partial P(T_{ao}, T_{co}, T_{ch}, T_{wb}, T_{out})}{\partial T_{ao}} = 0 \quad 0 = G_2(T_{co}, T_{ch}, T_{ao}, T_{wb}, T_{out})$$

$$\frac{\partial P(T_{ao}, T_{co}, T_{ch}, T_{wb}, T_{out})}{\partial T_{ch}} = 0 \quad 0 = G_3(T_{co}, T_{ch}, T_{ao}, T_{wb}, T_{out})$$

wherein $T_{co}$ denotes the temperature or the control temperature of the coolant, Tao denotes the temperature or the control temperature of the air, $T_{ch}$ denotes the temperature or the control temperature of the heat exchange medium, $T_{wb}$ denotes the wet-bulb temperature of ambient air, and $T_{out}$ denotes the dry-bulb temperature of the ambient air.

The control method may further include determining whether or not the calculated control temperature of the air higher than or equal to a preset first temperature and lower than or equal to a preset second temperature; setting the control temperature of the air to the first temperature in response to the control temperature of the air being lower than the first temperature; and setting the control temperature of the air to the second temperature in response to the control temperature of the air being higher than the second temperature.

The control method may further include determining whether or not the calculated control temperature of the heat exchange medium is higher than or equal to a preset third temperature and lower than or equal to a preset fourth temperature; setting the control temperature of the heat exchange medium to the third temperature in response to the control temperature of the heat exchange medium being lower than the third temperature; and setting the control temperature of the heat exchange medium to the fourth temperature in response to the control temperature of the heat exchange medium being higher than the fourth temperature.

The control method may further include determining whether or not the calculated control temperature of the coolant when the energy consumption is higher than or equal to a preset fifth temperature and lower than or equal to a preset sixth temperature; setting the control temperature of the coolant to the fifth temperature in response to the control temperature of the coolant being lower than the fifth temperature; and setting the control temperature of the coolant to the sixth temperature in response to the control temperature of the coolant being higher than the sixth temperature.

According to an aspect of another exemplary embodiment, there is provided a central cooling system including: a ventilation fan unit configured to control heat exchange between a heat exchange medium circulating in a first connection pipe and air provided to a predetermined area; a chiller unit configured to provide heat exchange between the heat exchange medium circulating in the first connection pipe and a coolant circulating in a second connection pipe; a cooling tower unit configured to provide heat exchange between ambient air outside of the central cooling system and the coolant circulating in a second connection pipe; a sensor unit configured to measure a temperature of each of the air, the coolant and the heat change medium and measure a temperature and humidity of the ambient air; and a control unit configured to calculate at least one of a control temperature of the heat exchange medium, a control temperature of the coolant, and a control temperature of the air based on a quadratic energy consumption function of the central cooling system relating to the temperature of each of the air, the coolant and the heat change medium and temperature and humidity of the ambient air, wherein the control unit is configured to control at least one of the ventilation fan unit, the chiller unit, and the cooling tower unit according to at least one of the calculated control temperatures of the heat exchange medium, the coolant, and the air.

BRIEF DESCRIPTION OF THE DRAWINGS

The above and/or other aspects will become apparent and more readily appreciated from the following description of the embodiments, taken in conjunction with the accompanying drawings in which:

FIG. 5 is a flowchart showing a control sequence of the cooling tower unit shown in FIG. 1 according to an exemplary embodiment.

DETAILED DESCRIPTION

Figure 1:
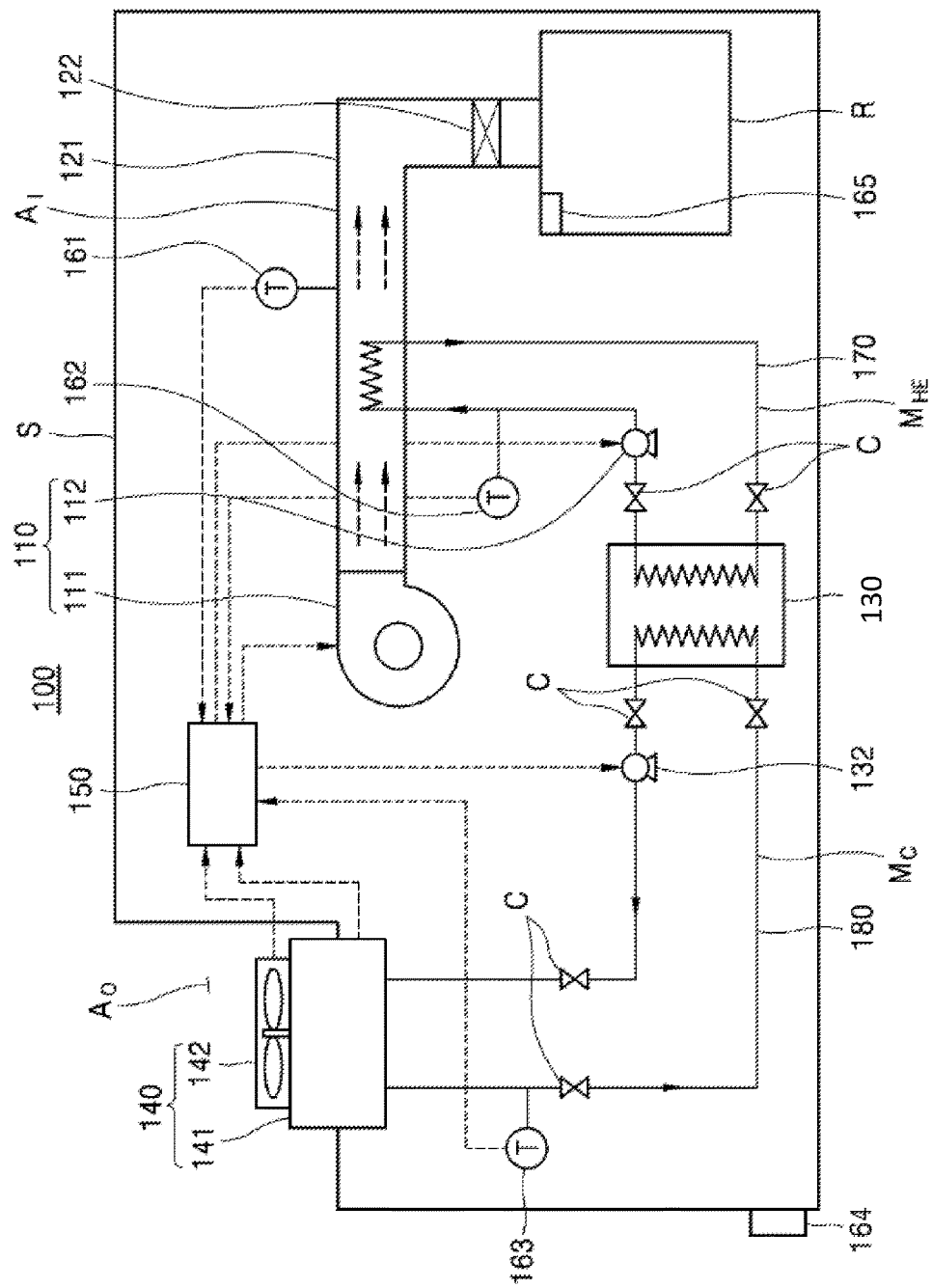
FIG. 1 is a conceptual diagram showing a central cooling system according to an exemplary embodiment.

Reference will now be made in detail to exemplary embodiments, examples of which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The terminology used herein is for the purpose of describing particular exemplary embodiments only and is not intended to be limiting of the inventive concepts. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concepts.

FIG. 1 is a conceptual diagram showing a central cooling system 100 according to an exemplary embodiment.

Referring to FIG. 1, the central cooling system 100 is an apparatus providing chilled air corresponding to a temperature set in a space R formed inside a building S. The space R may be a sectioned space inside the building S, and may be formed mainly in the form of a room.

The central cooling system 100 may include a guide duct 121 guiding the chilled air into the space R, and a control valve 122 provided in the guide duct 121 and controlling the amount of the chilled air flowing through the guide duct 121.

Also, the central cooling system 100 may include a first circulation pipe 170 through which a heat exchange medium $M_{HE}$ circulates, and a second circulation pipe 180 through which a coolant $M_C$ circulates.

The central cooling system 100 may include a ventilation fan unit 110 which chills and moves the air inside the guide duct 121. The ventilation fan unit 110 may include a ventilation fan 111 which is provided in the guide duct 121 and moves the air inside the guide duct 121. The ventilation fan unit 110 may also include a first pump 112 which is provided in the first circulation pipe 170 and chills the air inside the guide duct 121 by circulating a heat exchange medium $M_{HE}$ inside the first circulation pipe 170.

Meanwhile, the central cooling system 100 may include a chiller unit 130 which provides a heat exchange medium $M_{HE}$ so that heat exchange between air flowing into or out of the ventilation fan unit 110 and the heat exchange medium $M_{HE}$ may be performed to lower the temperature of the air.

A second pump 132 which is provided in the second circulation pipe 180 circulates the coolant $M_C$ inside the second circulation pipe 180.

The central cooling system 100 may include a cooling tower unit 140 which is connected to the second circulation pipe 180 and receives the coolant $M_C$ of the second circulation pipe 180 to cool the coolant $M_C$ through heat exchange between the coolant $M_C$ and ambient air $A_O$. The cooling tower unit 140 may include a cooling tower 141 which is connected to the second circulation pipe 180 and in which the coolant $M_C$ flows in such that the coolant $M_C$ is brought into contact with the ambient air $A_O$. The cooling tower unit 140 may also include a cooling fan 142 which is provided in the cooling tower 141 and circulates the ambient air $A_O$.

Meanwhile, the central cooling system 100 may include on-off valves C provided in each of the first circulation pipe 170 and the second circulation pipe 180. The on-off valves C may temporarily close the first circulation pipe 170 and the second circulation pipe 180 when each component is to be replaced or repaired in case of a breakdown.

In addition, in the on-off valves C, the amount of a heat exchange medium $M_{HE}$ or coolant $M_C$ flowing inside the first circulation pipe 170 and the second circulation pipe 180, respectively, may be controlled by controlling the degree of opening of the first circulation pipe 170 and the second circulation pipe 180.

Meanwhile, the central cooling system 100 may include a control unit 150 which controls operations of the ventilation fan unit 110, the chiller unit 130, and the cooling tower unit 140. The control unit 150 may be formed in a variety of forms, and may control all components of the central cooling system 100 in addition to the ventilation fan unit 110, the chiller unit 130, and the cooling tower unit 140. In particular, the control unit 150 may be formed as a portable terminal, a personal computer, or a notebook computer.

The central cooling system 100 may include a sensor unit 160 (FIG. 2) measuring the temperature and humidity. The sensor unit 160 may include a first sensor 161 which is provided in the guide duct 121 and measures the temperature of air sent by the ventilation fan 111. The sensor unit 160 may include a second sensor 162 which is provided in the first circulation pipe 170 and measures the temperature of the heat exchange medium $M_{HE}$ discharged from the chiller unit 130.

The sensor unit 160 may also include a third sensor 163 which is provided in the second circulation pipe 180 and measures the temperature of the coolant $M_C$ discharged from the cooling tower 141. The sensor unit 160 may include a fourth sensor 164 which is provided on the outside wall of the building S and measures the temperature and humidity of the ambient air $A_O$. In addition, the sensor unit 160 may include a fifth sensor 165 which is provided inside the space R and measures the temperature of the inside of the space R.

The operation of the central cooling system 100 formed as described above will now be explained in detail.

Figure 2:
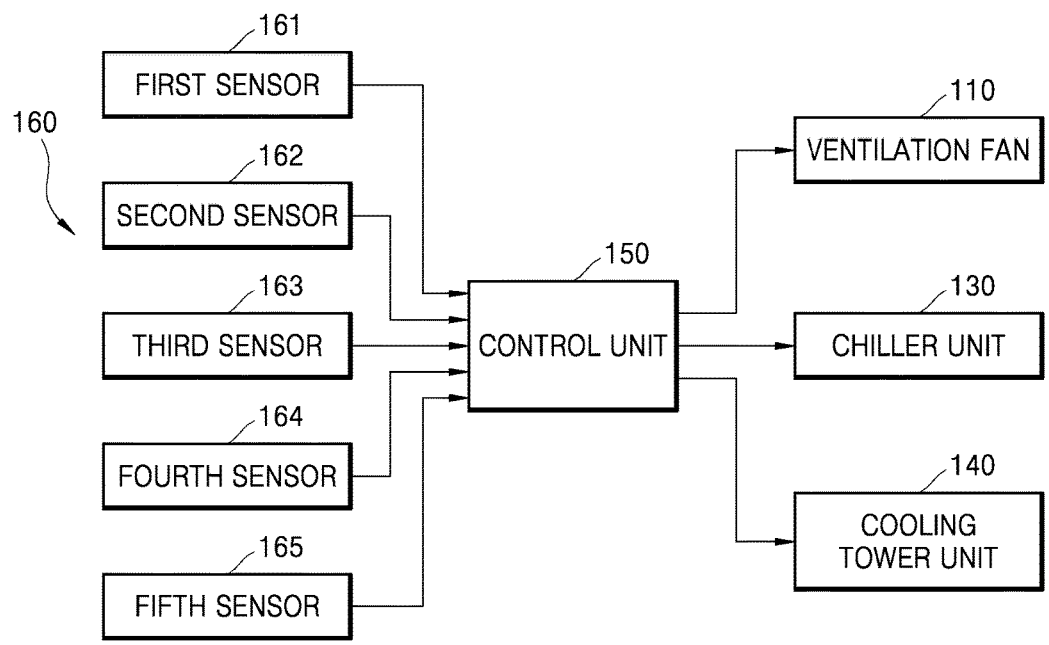
FIG. 2 is a block diagram showing a control flow of the central cooling system shown in FIG. 1 according to an exemplary embodiment.
Figure 3:
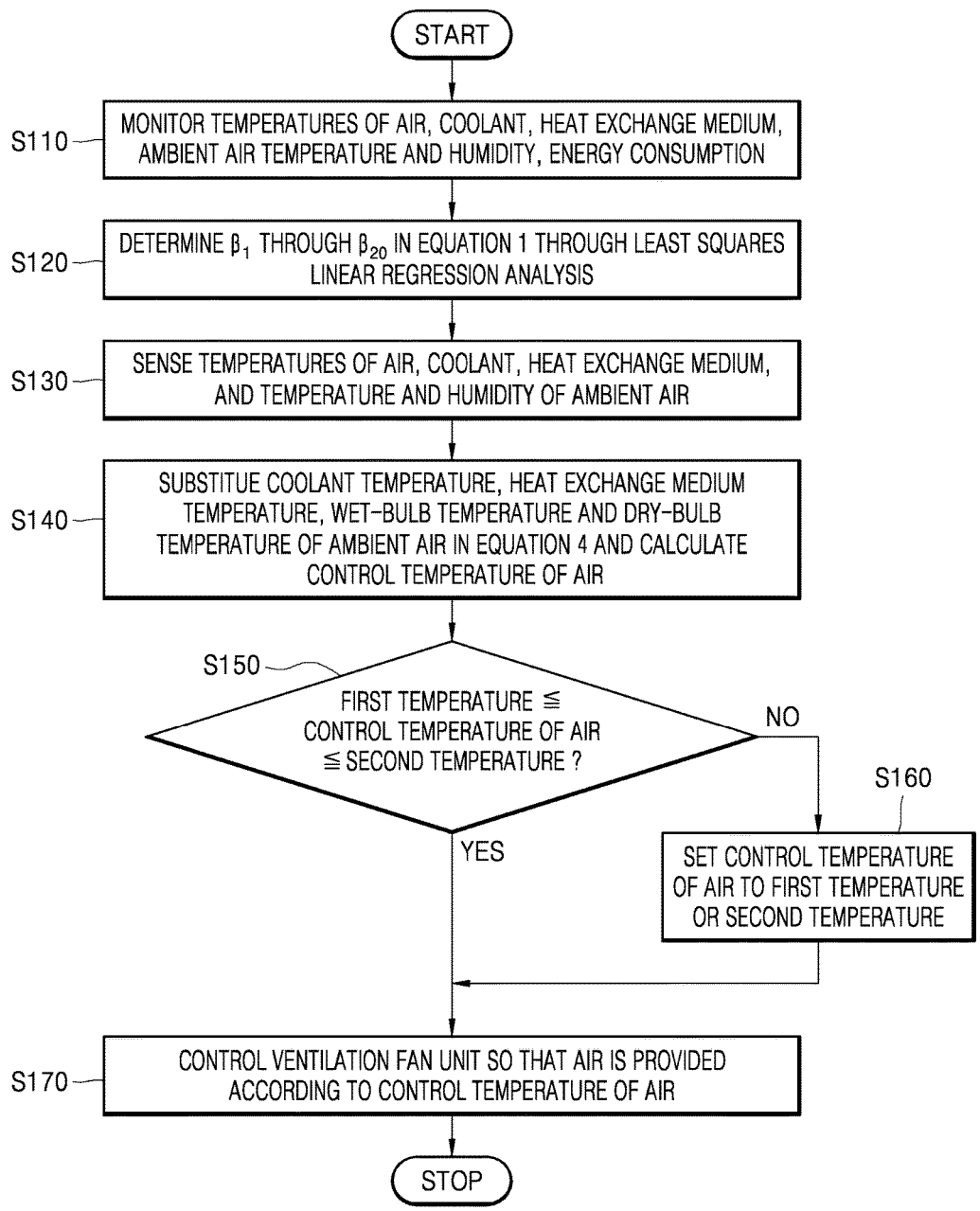
FIG. 3 is a flowchart showing a control sequence of the ventilation fan unit shown in FIG. 1 according to an exemplary embodiment.

FIG. 2 is a block diagram showing a control flow of the central cooling system 100 shown in FIG. 1 according to an exemplary embodiment. FIG. 3 is a flowchart showing a control sequence of the ventilation fan unit 110 shown in FIG. 1 according to an exemplary embodiment.

Referring to FIGS. 2 and 3, the control unit 150 may control at least one of the ventilation fan unit 110, the chiller unit 130, and the cooling tower unit 140, based on a variety of data measured in the sensor unit 160 including the plurality of sensors (161, 162, 163, 164 and 165). For convenience of explanation, each of methods for the control unit 150 to control the ventilation fan unit 110, the chiller unit 130, and the cooling tower unit 140 will now be explained in sequence. In the exemplary embodiment, the methods may be performed individually or may be performed in combination. However, for convenience of explanation, examples in which controls of the ventilation fan unit 110, the chiller unit 130 and the cooling tower unit 140 are individually performed will be explained hereinafter. However, the exemplary embodiments are not limited thereto and all cases in which control of at least one of the ventilation fan unit 110, the chiller unit 130 and the cooling tower unit 140 is performed may be included.

First, the method of controlling the ventilation fan unit 110 will now be explained. As described above, the sensor unit 160 may measure and monitor the temperature of the chilled air and blown inside the guide duct 121 in the first sensor 161; the temperature of the heat exchange medium $M_{HE}$ discharged from the chiller unit 130 in the second sensor 162; the temperature of the coolant $M_C$ discharged from the cooling tower 141 in the third sensor 163; and the temperature and humidity of the ambient air $A_O$ outside in the fourth sensor 164.

The control unit 150 may measure and monitor the total amount of energy consumed in the central cooling system 100. The control unit 150 may monitor the energy consumption by calculating the amount of energy consumed based on the amount and time of power input from the external source in operation S110.

A result value obtained from the measuring and monitoring as described above may be stored in the control unit 150. Here, the above process may continue while the central cooling system 100 is in operation, and in the initial stage of the operation, the measured and monitored values after performing a number of times of operations may also be stored in the control unit 150 as well.

Meanwhile, a constant may be obtained from a formula to obtain energy consumption of the central cooling system 100 through the monitoring results as described above. In detail, the energy consumption of the central cooling system 100 may be calculated from the following Equation (1):

$$\text{Power} = P(T_{co}, T_{ao}, T_{on}, T_{wb}, T_{out}) \quad \text{Equation (1)}$$

In the Equation (1), Power denotes the energy consumption of the central cooling system 100, $T_{co}$ denotes the temperature of a coolant $M_C$, $T_{ao}$ denotes the temperature of air $A_I$, $T_{ch}$ denotes the temperature of a heat exchange medium $M_{HE}$, $T_{wb}$ denotes the wet-bulb temperature of the ambient air $A_O$, and $T_{out}$ denotes the dry-bulb temperature of the ambient air $A_O$. The Equation (1) above is a quadratic function in which an optimum condition may be analytically determined for optimization.

Here, an example of the Equation (1) as described above may be expressed as the following Equation (2):

$$\begin{aligned}\text{Power} = &\beta_1 + \beta_2 T_{ch} + \beta_3 T_{ao} + \beta_4 T_{co} + \beta_5 T_{wb} + \beta_6 T_{out} + \\ &\beta_7 T_{ch}^2 + \beta_8 T_{ao}^2 + \beta_9 T_{co}^2 + \beta_{10} T_{wb}^2 + \beta_{11} T_{out}^2 + \\ &\beta_{12} T_{ch} T_{ao} + \beta_{13} T_{ch} T_{co} + \beta_{14} T_{ch} T_{wb} + \beta_{15} T_{ch} T_{out} + \\ &\beta_{16} T_{ao} T_{co} + \beta_{17} T_{ao} T_{wb} + \beta_{18} T_{ao} T_{out} + \beta_{19} T_{co} T_{wb} + \\ &\beta_{20} T_{co} T_{out}\end{aligned} \quad \text{Equation (2)}$$

Here, Power denotes the energy consumption of the central cooling system 100, $\beta_1$ through $\beta_{20}$ denote constants, $T_{co}$ denotes the temperature of a coolant $M_C$, $T_{ao}$ denotes the temperature of air $A_I$, $T_{ch}$ denotes the temperature of a heat exchange medium $M_{HE}$, $T_{wb}$ denotes the wet-bulb temperature of the ambient air $A_O$, and $T_{out}$ denotes the dry-bulb temperature of the ambient air $A_O$.

Here, the measured and monitored results from the sensor unit 160 and the control unit 150 may be used as the energy consumption, the temperature of the coolant $M_C$, the temperature of air $A_I$, the temperature of the heat exchange medium $M_{HE}$, and the wet-bulb temperature and dry-bulb temperature of the ambient air $A_O$ may be calculated from the temperature and humidity of the ambient air $A_O$ measured from the sensor unit 160.

If the result values as above are input, the equation becomes a linear function related to the coefficients or constant values of the Equation (1), for example, $\beta_1$ through $\beta_{20}$ of the Equation (2), and the linear function is repeated many times such as several times or hundreds of times, to obtain an equation. Then, the coefficients or constant values (i.e. $\beta_1$ through $\beta_{20}$) of the Equation (1) may be determined by using a least squares linear regression analysis. Here, a program or the like required for the least squares linear regression analysis may be already stored in the control unit 150 in operation S120.

The coefficients or constant values (i.e. $\beta_1$ through $\beta_{20}$) as described above may be determined through a pilot operation in an initial stage of the operation of the central cooling system 100, or may also be obtained as results of a simulation after inputting operating conditions considering the features of a building.

Meanwhile, if the coefficients or constant values (i.e. $\beta_1$ through $\beta_{20}$) are determined as described above, the temperature of air $A_I$, the temperature of the heat exchange medium $M_{HE}$, the temperature of the coolant $M_C$, and the temperature and humidity of the ambient air $A_O$ may be again measured through the first, second, third, and fourth sensors 161, 162, 163, and 164, respectively, in operation S130.

If the measuring of the various values from the sensors 161, 162, 163, and 164 is completed as above, a control temperature of air $A_I$, a control temperature of the heat exchange medium $M_{HE}$, and a control temperature of the coolant $M_C$ may be calculated according to a minimum value of energy consumption to be used for cooling the building S.

In detail, each optimum value of the control temperatures of the air $A_I$, the heat exchange medium $M_{HE}$ and the coolant $M_C$, may be determined when the first derivative for the control temperatures of the air $A_I$, the heat exchange medium $M_{HE}$ and the coolant $M_C$ becomes 0, considering that the Equation (1) is a quadratic function. In particular, the control temperatures of the air $A_I$, the heat exchange medium $M_{HE}$ and the coolant $M_C$ as described above may be obtained by the following Equations (3)-(5):

$$\frac{\partial P(T_{ao}, T_{co}, T_{ch}, T_{wb}, T_{out})}{\partial T_{co}} = 0 \quad 0 = G_1(T_{co}, T_{ch}, T_{ao}, T_{wb}, T_{out})$$

Equation (3)

$$\frac{\partial P(T_{ao}, T_{co}, T_{ch}, T_{wb}, T_{out})}{\partial T_{ao}} = 0 \quad 0 = G_2(T_{co}, T_{ch}, T_{ao}, T_{wb}, T_{out})$$

Equation (4)

$$\frac{\partial P(T_{ao}, T_{co}, T_{ch}, T_{wb}, T_{out})}{\partial T_{ch}} = 0 \quad 0 = G_3(T_{co}, T_{ch}, T_{ao}, T_{wb}, T_{out})$$

Equation (5)

Here, $T_{co}$ may denote the temperature or the control temperature of a coolant $M_C$, $T_{ao}$ may denote the temperature or the control temperature of air $A_I$, $T_{ch}$ may denote the temperature or the control temperature of a heat exchange medium $M_{HE}$, $T_{wb}$ may denote the wet-bulb temperature of the ambient air $A_O$, and $T_{out}$ may denote the dry-bulb temperature of the ambient air $A_O$. That is, the values other than the control temperatures of $T_{co}$, $T_{ao}$, and $T_{ch}$ which are desired to be obtained may be temperatures measured in the sensor unit 160 in the Equations (3)-(5).

When the Equation (2) is used as an example of a quadratic function of Equation (1), Equations (3)-(5) may be expressed as the following Equations (6)-(8), respectively:

$$\frac{\partial P}{\partial T_{co}} = 0 \quad 0 = \beta_4 + 2\beta_9 T_{co} + \beta_{13} T_{ch} + \beta_{16} T_{ao} + \beta_{19} T_{wb} + \beta_{20} T_{out}$$

Equation (6)

$$\frac{\partial P}{\partial T_{ao}} = 0 \quad 0 = \beta_3 + 2\beta_8 T_{ao} + \beta_{12} T_{ch} + \beta_{16} T_{co} + \beta_{17} T_{wb} + \beta_{18} T_{out}$$

Equation (7)

$$\frac{\partial P}{\partial T_{ch}} = 0 \quad 0 = \beta_2 + 2\beta_7 T_{ch} + \beta_{12} T_{ao} + \beta_{13} T_{co} + \beta_{14} T_{wb} + \beta_{15} T_{out}$$

Equation (8)

Here, $\beta_1$ through $\beta_{20}$ denote constants, $T_{co}$ may denote the temperature or the control temperature of a coolant $M_C$, $T_{ao}$ may denote the temperature or the control temperature of air $A_I$, $T_{ch}$ may denote the temperature or the control temperature of a heat exchange medium $M_{HE}$, $T_{wb}$ may denote the wet-bulb temperature of the ambient air $A_O$, and $T_{out}$ may denote the dry-bulb temperature of the ambient air $A_O$. That is, the values other than the control temperatures of $T_{co}$, $T_{ao}$, and $T_{ch}$ which are desired to be obtained may be temperatures measured in the sensor unit 160 in the Equations (6)-(8).

Here, with respect to the control temperatures of the air $A_I$, the heat exchange medium $M_{HE}$ and the coolant $M_C$, the Equation (6)-(8) may be expressed as the following Equations (9)-(11):

$$T_{co} = a_1 + a_2 T_{wb} + a_3 T_{out}$$

Equation (9)

$$T_{ao} = b_1 + b_2 T_{co} + b_3 T_{wb} + b_4 T_{out}$$

Equation (10)

$$T_{ch} = c_1 + c_2 T_{co} + c_3 T_{ao} + c_4 T_{wb} + c_5 T_{out}$$

Equation (11)

Here, $a_1$ through $a_3$, $b_1$ through $b_4$, and $c_1$ through $c_5$ may be constants.

Accordingly, in order to calculate the control temperature of the air $A_I$ in the Equations (10), the measured or calculated temperatures of the heat exchange medium $M_{HE}$, the coolant $M_C$, and the wet-bulb temperature and dry-bulb temperature of the ambient air $A_O$ may be substituted in the Equations (4) in operation S140.

If calculation of the control temperature of the air $A_I$ is completed as described above, the control unit 150 may determine whether or not the control temperature of the air $A_I$ is within a temperature range preset in the control unit 150.

In detail, the control unit 150 may determine whether or not the control temperature of the air $A_I$ is higher than or equal to a preset first temperature and lower than or equal to a preset second temperature in operation S150. The preset first and second temperature may be set, for example, according to the operating limits of the ventilation fan unit 130.

If it is determined that the control temperature of the air $A_I$ is lower than the first preset temperature or higher than the second preset temperature, the control unit 150 may set the control temperature of the air so that the control temperature may be equal to the first temperature or the second temperature. In detail, if the calculated control temperature of the air is lower than the first temperature, the control unit 150 may set the control temperature of the air $A_I$ for controlling the ventilation fan unit 110 to the first temperature. Meanwhile, if the calculated control temperature of the air is higher than the second temperature, the control unit 150 may set the control temperature of the air $A_I$ for controlling the ventilation fan unit 110 to the second temperature in operation S160.

In addition to the above case, if the control temperature of the air is between the first temperature and the second temperature, the control unit 150 may use the control temperature of the air $A_I$ calculated in the Equation (4) without a change.

If the above process is completed and the control temperature of the air is determined, the control unit 150 may control the ventilation fan unit 110 so that the temperature of the air may be equal to the control temperature of the air.

For example, if it is determined that the control temperature of the air is higher than the temperature of the air measured in the first sensor 161, the control unit 150 may control at least one of the ventilation fan 111 and the first pump 112 so that the wind volume of the ventilation fan 111 or the amount of fluid discharged from the first pump 112 may be decreased.

Meanwhile, if it is determined that the control temperature of the air is lower than the temperature of the air measured in the first sensor 161, the control unit 150 may control at least one of the ventilation fan 111 and the first pump 112 so that the wind volume of the ventilation fan 111 or the amount of fluid discharged from the first pump 112 may be increased in operation S170.

Accordingly, the central cooling system 100 controls the ventilation fan unit 110, by calculating the control temperature of the air minimizing the energy consumption. By doing so, the central cooling system 100 may calculate an optimum set point when the central cooling system 100 is in operation.

In particular, as the central cooling system 100 may be operated at an optimum set point, the energy and cost required for the operation may be reduced.

Meanwhile, a control method of the chiller unit 130 will now be explained in detail.

Figure 4:
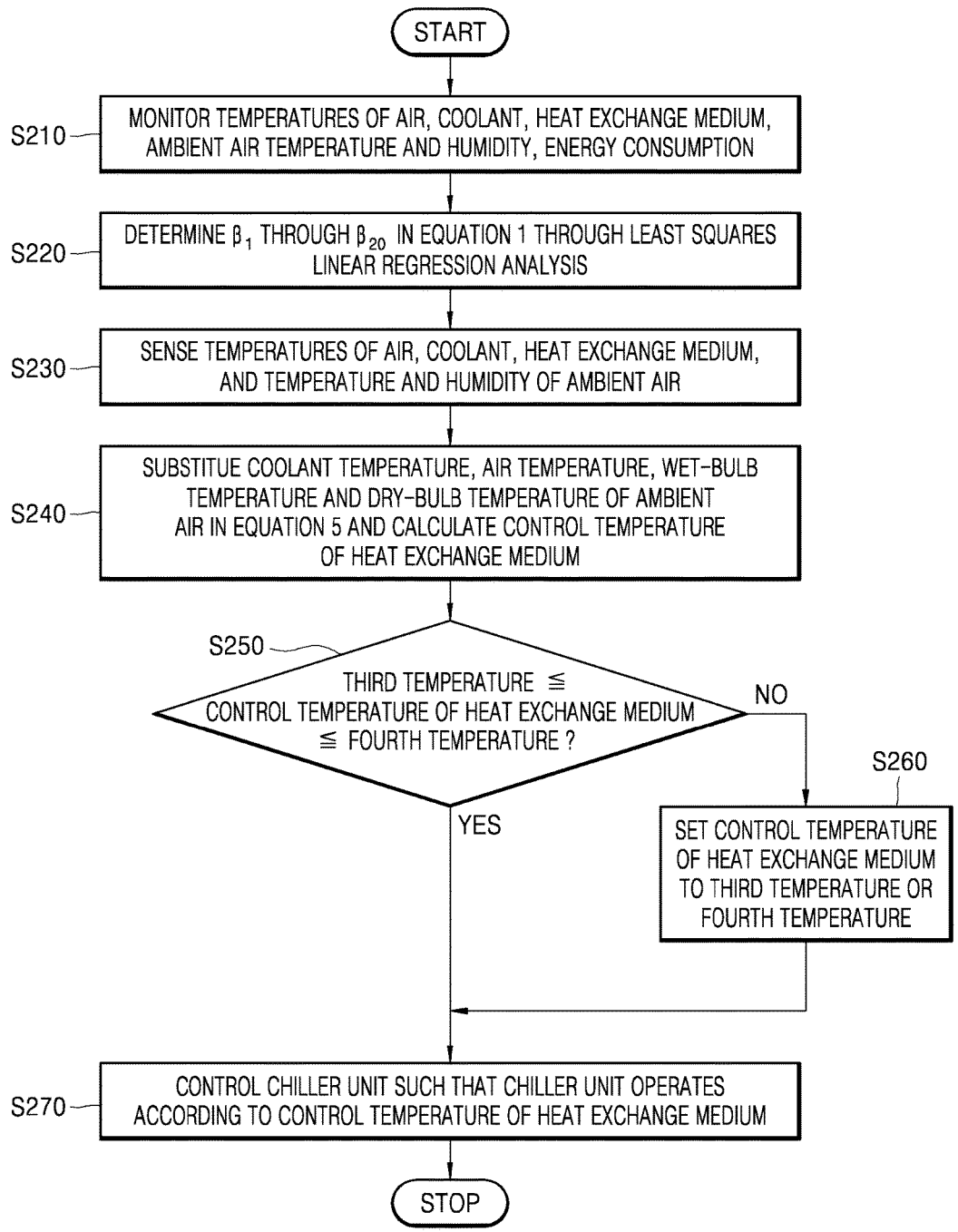
FIG. 4 is a flowchart showing a control sequence of the chiller unit shown in FIG. 1 according to an exemplary embodiment.

FIG. 4 is a flowchart showing a control sequence of the chiller unit 130 shown in FIG. 1 according to an exemplary embodiment.

Referring to FIG. 4, the control method of the chiller unit 130 may be performed in a similar manner to that of the control method of the ventilation fan unit 110 explained above referring to FIG. 3.

In detail, the temperature of air, the temperature of a heat exchange medium $M_{HE}$, the temperature of a coolant $M_C$, and the temperature and humidity of the ambient air $A_O$ may be measured and monitored through the first through fourth sensors 161 through 164, and the energy consumption of the central cooling system 100 may be measured and monitored in the control unit 150, in operation S210.

Here, based on the result values measured and monitored as described above, coefficients or constant values (for example, $\beta_1$ through $\beta_{20}$ of the Equation (2)) may be determined. Here, a method for determining the coefficients or constant values (for example, $\beta_1$ through $\beta_{20}$ of the Equation (2)) may be performed through the least square linear regression analysis, as explained above, in operation S220.

The above process may be performed in a pilot operation or simulation as described above.

Meanwhile, if the central cooling system 100 is operated again after the above process is completed, the central cooling system 100 may be controlled to find an optimum set point.

In detail, if the system is stabilized after a predetermined time passes after the operation of the central cooling system 100 starts, the first through fourth sensors 161 through 164 may measure the temperature of air $A_I$, the temperature of a heat exchange medium $M_{HE}$, the temperature of a coolant $M_C$, and the temperature and humidity of the ambient air $A_O$, and send them to the control unit 150 in operation S230.

Here, the control unit 150 may obtain the Equation (9)-(11) from the Equations (6)-(8), and calculate a control temperature of the heat exchange medium $M_{HE}$ through the Equation (11) in operation S240.

If the above process is completed, the control unit 150 may determine whether or not the calculated control temperature of the heat exchange medium $M_{HE}$ is higher than or equal to a preset third temperature and lower than or equal to a preset fourth temperature in operation S250. The preset third and fourth temperature may be set, for example, according to the operating limits of the chiller unit 130.

Here, if the control temperature of the heat exchange medium $M_{HE}$ deviates from the range between the third temperature and the fourth temperature, the control unit 150 may set the control temperature of the heat exchange medium $M_{HE}$ for controlling the chiller unit 130, to the third temperature or the fourth temperature. In particular, if the calculated control temperature of the heat exchange medium $M_{HE}$ is lower than the third temperature, the control unit 150 may set the control temperature for controlling the chiller unit 130 to the third temperature. Also, if the calculated control temperature of the heat exchange medium $M_{HE}$ is higher than the fourth temperature, the control unit 150 may set the control temperature for controlling the chiller unit 130 to the fourth temperature.

Accordingly, when the calculated control temperature of the heat exchange medium $M_{HE}$ deviates from the range between the third temperature and the fourth temperature, the control temperature of the heat exchange medium $M_{HE}$ for controlling the chiller unit 130 may be adjusted as described above. By doing so, a breakdown or malfunction of the central cooling system 100 caused by the chiller unit 130 operating outside the operation range may be prevented in operation S260.

On the other hand, if the calculated control temperature of the heat exchange medium $M_{HE}$ is within the range between the third temperature and the fourth temperature, the calculated control temperature of the heat exchange medium $M_{HE}$ may be used as the control temperature of the heat exchange medium $M_{HE}$ for controlling the chiller unit 130.

Meanwhile, if the control temperature of the heat exchange medium $M_{HE}$ is determined as described above, the chiller unit 130 may be controlled based on the determined control temperature of the heat exchange medium $M_{HE}$. In detail, if the control temperature of the heat exchange medium $M_{HE}$ is higher than the temperature of the heat exchange medium $M_{HE}$ measured in the second sensor 162, the control unit 150 may control the second pump 132 so that the speed of the coolant $M_C$ circulating through the second circulation pipe 180 may be reduced. Here, if the speed of the coolant $M_C$ decreases, the heat exchange between the coolant $M_C$ and the heat exchange medium $M_{HE}$ is reduced and thus the temperature of the heat exchange medium $M_{HE}$ may be increased. Accordingly, the temperature of the heat exchange medium $M_{HE}$ may be controlled so that it may be equal to the control temperature of the heat exchange medium $M_{HE}$.

Meanwhile, in an opposite case, the control unit 150 may control the second pump 132 so that the speed of the coolant $M_C$ circulating through the second circulation pipe 180 may increase. In this case, the heat exchange between the coolant $M_C$ and the heat exchange medium $M_{HE}$ is performed quickly contrary to the former case described above, and thus the temperature of the heat exchange medium $M_{HE}$ may be equal to the control temperature of the heat exchange medium $M_{HE}$ in operation S270.

Meanwhile, in cases other than the above cases, if a separate control unit (not shown) is in the chiller unit 130, the control temperature of the heat exchange medium $M_{HE}$ may be transferred to the control unit of the chiller unit 130 so that the temperature of the heat exchange medium $M_{HE}$ may be controlled to be equal to the control temperature of the heat exchange medium $M_{HE}$.

Accordingly, the central cooling system 100 controls the chiller unit 130 by calculating the control temperature of the heat exchange medium $M_{HE}$ that may minimize the energy consumption. By doing so, the energy consumption of the central cooling system 100 may be minimized.

A control sequence of the cooling tower unit 140 will now be explained in detail.

FIG. 5 is a flowchart showing a control sequence of the cooling tower unit shown in FIG. 1 according to an exemplary embodiment.

Referring to FIG. 5, the control method of the cooling tower unit 140 may be performed in a similar manner to that of the control method of the ventilation fan unit 110 explained above referring to FIG. 3.

In detail, the temperature of air, the temperature of a heat exchange medium $M_{HE}$, the temperature of a coolant $M_C$, and the temperature and humidity of the ambient air $A_O$ may be through the first sensor 161 through the fourth sensor 164, and the energy consumption of the whole system may be monitored in the control unit 150, in operation S310.

Here, based on the measured and monitored result values as described above, coefficients or constant values (for example, β1 through β20 of the Equation (2)) may be determined. Here, a method for determining the coefficients or constant values (for example, β1 through β20 of the Equation (2)) may be performed through the least square linear regression analysis, as explained above, in operation S320.

The above process may be performed in a pilot operation or simulation as described above.

Meanwhile, if the central cooling system 100 is operated again after the above process is completed, the central cooling system 100 may be controlled to find an optimum set point.

In detail, if the system is stabilized after a predetermined time passes after the operation of the central cooling system starts, the first through fourth sensors 161 through 164 may measure the temperature of air, the temperature of a heat exchange medium $M_{HE}$, the temperature of a coolant $M_C$, and the temperature and humidity of the ambient air $A_O$, and send them to the control unit 150 in operation S330.

Here, the control unit 150 may obtain the Equations (9)-(11) from the Equations (6)-(8), and calculate a control temperature of the coolant $M_C$ through the Equation (9) in operation S340.

If the above process is completed, the control unit 150 may determine whether or not the calculated control temperature of the coolant $M_C$ is higher than or equal to a preset fifth temperature and lower than or equal to a preset sixth temperature in operation S250. The preset fifth and sixth temperature may be set, for example, according to the operating limits of the cooling tower unit 140.

Here, if the control temperature of the coolant $M_C$ is outside the range between the fifth temperature and the sixth temperature, the control unit 150 may set the control temperature of the coolant $M_C$ for controlling the cooling tower unit 140, to the fifth temperature or the sixth temperature. In particular, if the calculated control temperature of the coolant $M_C$ is lower than the fifth temperature, the control unit 150 may set the control temperature for controlling the cooling tower unit 140 to the fifth temperature. Also, if the calculated control temperature of the coolant $M_C$ is higher than the sixth temperature, the control unit 150 may set the control temperature for controlling the cooling tower unit 140 to the sixth temperature.

Accordingly, when the calculated control temperature of the coolant $M_C$ is outside the range between the fifth temperature and the sixth temperature, the control temperature of the coolant $M_C$ for controlling the cooling tower unit 140 may be adjusted as described above. By doing so, a breakdown or malfunction of the central cooling system 100 caused by the cooling tower unit 140 operating outside the operation range may be prevented in operation S360.

On the other hand, if the calculated control temperature of the coolant $M_C$ is within the range between the fifth temperature and the sixth temperature, the calculated control temperature of the coolant $M_C$ may be used as the control temperature of the coolant $M_C$ for controlling the cooling tower unit 140.

Meanwhile, if the control temperature of the coolant $M_C$ is determined as described above, the cooling tower unit 140 may be controlled based on the determined control temperature of the coolant $M_C$. In detail, if the control temperature of the coolant $M_C$ is higher than the temperature of the coolant $M_C$ measured in the third sensor 163, the control unit 150 may control the speed of the cooling fan 142 to be reduced. Here, if the speed of the cooling fan 142 decreases, the heat exchange between the coolant $M_C$ and the ambient air $A_O$ is reduced, and thus the temperature of the coolant $M_C$ may be increased or maintained, or may be lowered by a degree smaller than before. Accordingly, the temperature of the coolant $M_C$ may be controlled to be equal to the control temperature of the coolant $M_C$.

Meanwhile, in an opposite case, the control unit 150 may control to increase the speed of the cooling fan 142. In this case, the heat exchange between the coolant $M_C$ and the ambient air $A_O$ is performed quickly contrary to the former case described above, and thus the temperature of the coolant $M_C$ may be lowered to be equal to the control temperature of the coolant $M_C$.

Accordingly, the central cooling system 100 controls the cooling tower unit 140, by calculating the control temperature of the coolant $M_C$ that may minimize the energy consumption. By doing so, the energy consumption of the central cooling system 100 may be minimized.

The control methods of the central cooling system 100 described above may be performed by calculating at least one of the control temperatures of the air, the heat exchange medium $M_{HE}$ and the coolant $M_C$. In this case, the calculating method and the method for performing control operations may be the same as or similar to those described above. However, when at least two of the control temperatures of the heat exchange medium $M_{HE}$ and the coolant $M_C$ are calculated for controlling, control may be performed sequentially by calculating firstly, one of the control temperatures of the heat exchange medium $M_{HE}$ and the coolant $M_C$, and then, calculating other values.

Accordingly, the central cooling system 100 may calculate optimum operation points for the ventilation fan unit 110, the chiller unit 130, and the cooling tower unit 140, the optimum operation points corresponding to a minimum value of the energy consumption required for maintaining the temperature of the space R under current states with respect to the ambient air $A_O$, and may perform control operations.

As described above, according to the one or more of the above exemplary embodiments, the central cooling system 100 may calculate optimum operation points for the ventilation fan unit 110, the chiller unit 130, and the cooling tower unit 140, the optimum operation points corresponding to a minimum value of the energy consumption required for maintaining the temperature of the space R under current states with respect to the ambient air $A_O$, and may perform control operations.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described above, it will be understood by those of ordinary skill in the art that various changes in form and details may be made therein without departing from the spirit and scope of the inventive concept as defined by the following claims.

What is claimed is:

1. A central cooling system comprising:
   a ventilation fan unit configured to provide air to a predetermined space and including a ventilation fan;
   a chiller unit configured to provide a heat exchange medium to lower a temperature of the air through heat exchange between the air flowing into or out of the ventilation fan unit and the heat exchange medium;
   a cooling tower unit configured to provide a coolant to the chiller unit, the coolant lowering a temperature of the heat exchange medium through heat exchange between the coolant and the heat exchange medium in the chiller unit, the cooling tower unit configured to lower a temperature of the coolant through heat exchange between the coolant and ambient air outside of the predetermined space;
   a sensor unit comprising:
   a first sensor;
   a second sensor;

a third sensor; and a fourth sensor, the first sensor configured to measure the temperature of the air provided from the ventilation fan unit, the second sensor configured to measure the temperature of the heat exchange medium discharged from the chiller unit, the third sensor configured to measure the temperature of the coolant entering the chiller unit from the cooling tower unit for the heat exchange between the coolant and the heat exchange medium in the chiller unit, and the fourth sensor configured to measure a temperature and humidity of the ambient air; and a control unit configured to monitor energy consumption of the central cooling system according to the temperature of the air, the temperature of the heat exchange medium and the temperature of the coolant measured in the sensor unit when the ventilation fan unit, the chiller unit and the cooling tower unit are in operation, and configured to calculate at least one of a control temperature of the heat exchange medium, a control temperature of the coolant, and a control temperature of the air which minimizes the energy consumption based on the measured temperatures of the heat exchange medium, the coolant, the air and the ambient air and the humidity of the ambient air by the sensor unit, wherein the heat exchange between the air flowing out of the ventilation fan unit and the heat exchange medium occurs in a guide duct connecting an outlet of the ventilation fan to the predetermined space, wherein the first sensor measures the temperature of the air at a location downstream of the heat exchange between the air flowing into or out of the ventilation fan unit and the heat exchange medium, and wherein the control unit is configured to calculate the energy consumption (Power) by a quadratic function (P) in which an optimum condition is analytically determined according to the following equation:

$$\text{Power} = \beta_1 + \beta_2 T_{ch} + \beta_3 T_{ao} + \beta_4 T_{co} + \beta_5 T_{wb} + \beta_6 T_{out} + \beta_7 T_{ch}^2 + \beta_8 T_{ao}^2 + \beta_9 T_{co}^2 + \beta_{10} T_{wb}^2 + \beta_{11} T_{out}^2 + \beta_{12} T_{ch} T_{ao} + \beta_{13} T_{ch} T_{co} + \beta_{14} T_{ch} T_{wb} + \beta_{15} T_{ch} T_{out} + \beta_{16} T_{ao} T_{co} + \beta_{17} T_{ao} T_{wb} + \beta_{18} T_{ao} T_{out} + \beta_{19} T_{co} T_{wb} + \beta_{20} T_{co} T_{out},$$

where $\beta_1$ through $\beta_{20}$ denote constants, $T_{co}$ denotes the temperature of the coolant, $T_{ao}$ denotes the temperature of the air, $T_{ch}$ denotes the temperature of the heat exchange medium, $T_{wb}$ denotes a wet-bulb temperature of the ambient air, and $T_{out}$ denotes a dry-bulb temperature of the ambient air.

2. The central cooling system of claim 1, wherein the control unit is configured to control the operation of at least one of the ventilation fan unit, the chiller unit, and the cooling tower unit corresponding to at least one of the calculated control temperatures of the heat exchange medium, the coolant, and the air.

3. The central cooling system of claim 1, wherein the control unit is configured to determine at least one coefficient or constant value of the quadratic function (P) through a least squares linear regression analysis for the energy consumption of the central cooling system according to measured temperatures of the heat exchange medium, the coolant, and the air and humidity in the sensor unit when the central cooling system is in operation.

4. The central cooling system of claim 1, wherein the control unit is configured to compare the calculated control temperature of the heat exchange medium with a first temperature range and configured to set the control temperature of the heat exchange medium according to a result of the comparison.

5. The central cooling system of claim 1, wherein the control unit is configured to compare the calculated control temperature of the coolant with a second temperature range and configured to set the control temperature of the coolant according to a result of the comparison.

6. The central cooling system of claim 1, wherein the control unit is configured to compare the calculated control temperature of the air with a third temperature range and configured to set the control temperature of the air according to a result of the comparison.

* * * * *